US010599826B2

(12) United States Patent
Kazerani et al.

(10) Patent No.: US 10,599,826 B2
(45) Date of Patent: Mar. 24, 2020

(54) DECOUPLED AUTHORIZATION FOR RESTRICTED RESOURCE ACCESS

(71) Applicant: OpenPath Security Inc., Marina Del Rey, CA (US)

(72) Inventors: Alexander A. Kazerani, Santa Monica, CA (US); Robert J. Peters, Culver City, CA (US); Samy Kamkar, Los Angeles, CA (US)

(73) Assignee: OPENPATH SECURITY INC., Marina Del Rey, CA (US)

( * ) Notice: Subject to any disclaimer, the term of this patent is extended or adjusted under 35 U.S.C. 154(b) by 129 days.

(21) Appl. No.: 15/695,085

(22) Filed: Sep. 5, 2017

(65) Prior Publication Data

US 2019/0073468 A1 Mar. 7, 2019

(51) Int. Cl.
| | | |
|---|---|---|
| *G06F 21/00* | (2013.01) | |
| *G06F 21/35* | (2013.01) | |
| *H04L 29/06* | (2006.01) | |
| *H04W 4/80* | (2018.01) | |
| *H04W 12/00* | (2009.01) | |
| *H04W 12/08* | (2009.01) | |
| *G07C 9/00* | (2020.01) | |
| *G07C 9/28* | (2020.01) | |

(52) U.S. Cl.
CPC ............ *G06F 21/35* (2013.01); *H04L 63/107* (2013.01); *H04W 4/80* (2018.02); *H04W 12/00508* (2019.01); *H04W 12/08* (2013.01); *G07C 9/00174* (2013.01); *G07C 9/28* (2020.01); *G07C 2209/63* (2013.01); *H04L 63/0853* (2013.01)

(58) Field of Classification Search
CPC ......... G06F 21/35; H04W 4/80; H04W 12/08; H04W 12/00508; H04L 63/107; H04L 63/0853
See application file for complete search history.

(56) References Cited

U.S. PATENT DOCUMENTS

| | | | |
|---|---|---|---|
| 4,804,945 | A | 2/1989 | Millet |
| 9,767,630 | B1 | 9/2017 | Kazerani et al. |
| 10,037,525 | B2 | 7/2018 | Neafsey |
| 10,108,272 | B1 * | 10/2018 | DeBates ................. G06F 3/017 |
| 2002/0014954 | A1 | 2/2002 | Fitzgibbon et al. |
| 2004/0036573 | A1 | 2/2004 | Fitzgibbon et al. |
| 2005/0266803 | A1 | 12/2005 | Dinur et al. |
| 2007/0288995 | A1 | 12/2007 | Terada et al. |

(Continued)

*Primary Examiner* — Christopher C Harris
(74) *Attorney, Agent, or Firm* — Ansari Katiraei LLP; Arman Katiraei; Sadiq Ansari

(57) ABSTRACT

Systems and methods for performing decoupled authorization, whereby authorizing access permissions of a user to a resource is performed separate and independent from authorizing intent of the user to access the resource. Once both authorizations are successfully completed within a specified timeout interval, the access state of the resource is changed, thereby granting the user access to the resource. The decoupled authorizations are independently performed over different networks, in response to different triggers, or by leveraging different hardware. Access to the resource can therefore be provided prior to the user arriving before the resource, with little to no action by the user, and without comprising security as the resources will remain restricted or locked if the either of the user's intent or access permissions cannot be verified.

17 Claims, 6 Drawing Sheets

(56) References Cited

U.S. PATENT DOCUMENTS

| | | | |
|---|---|---|---|
| 2008/0017705 A1 | 1/2008 | Costello et al. | |
| 2011/0061100 A1* | 3/2011 | Mattila | G06F 3/017 726/17 |
| 2011/0311052 A1* | 12/2011 | Myers | H04W 12/08 380/270 |
| 2012/0280790 A1 | 11/2012 | Gerhardt et al. | |
| 2014/0049361 A1 | 2/2014 | Ahearn et al. | |
| 2014/0077929 A1 | 3/2014 | Dumas et al. | |
| 2014/0125453 A1 | 5/2014 | McIntyre et al. | |
| 2014/0188348 A1 | 7/2014 | Gautama et al. | |
| 2014/0253385 A1 | 9/2014 | Amizur et al. | |
| 2014/0340196 A1 | 11/2014 | Myers et al. | |
| 2015/0055564 A1 | 2/2015 | Alam et al. | |
| 2015/0371026 A1 | 12/2015 | Gnanasekaran | |
| 2016/0180618 A1* | 6/2016 | Ho | G07C 9/00563 340/5.52 |
| 2016/0267729 A1 | 9/2016 | Baumgarte et al. | |
| 2016/0308859 A1* | 10/2016 | Barry | H04L 63/0861 |
| 2016/0321517 A1 | 11/2016 | Gandolph et al. | |
| 2016/0343185 A1* | 11/2016 | Dumas | G07C 9/00309 |
| 2017/0140593 A1 | 5/2017 | Pluss et al. | |
| 2017/0301166 A1* | 10/2017 | Earles | G07C 9/00007 |
| 2019/0073846 A1 | 3/2019 | Kamkar et al. | |

\* cited by examiner

DECOUPLED AUTHORIZATION FOR RESTRICTED RESOURCE ACCESS

BACKGROUND ART

A mobile device, such as a smartphone, can be adapted for a multitude of uses because of its hardware array and software programmability. A single mobile device can interchangeably be used as a communication device, camera, secure payment device, audio recording device, gaming platform, navigation device, Internet browser, music player, flashlight, health monitor, calendaring tool, and email access device as some adaptations in use today. Each such adaptation is intended to consolidate and reduce the number of different devices and physical objects that people carry with them.

Physical keys and keycards remain in wide-spread use even though mobile devices have the requisite hardware and software to adapt for the very same purpose of authorizing access to a restricted resource. This particular adaptation of the mobile device is stalled because of several shortcomings in the prior art implementations.

Mobile devices can securely store access credentials or other tokens, and wirelessly transmit the access credentials or other tokens when in range of a reader or access control unit as do keycards. However, keycards provide a near instantaneous authorization that completes in a few hundred milliseconds, whereas current implementations with mobile devices can take several seconds to complete. These additional seconds have significant impact to the overall user experience.

The added delay is attributable in part to the additional actions that a user performs when using the mobile device in place of a keycard. The user first retrieves the mobile device, unlocks the mobile device, opens an authorization application, and initiates the authorization with a press, gesture, or other command. These steps are several times slower than retrieving a keycard and moving it in range of a reader.

Even if these physical actions by the user are eliminated by having the mobile device automatically initiate the access authorization, there is still delay in using the mobile device instead of a keycard. Authorizing access with a mobile device involves the mobile device detecting a wireless signal for communicably coupling to the reader or access control unit. This can be a Bluetooth discovery signal or a WiFi network service set identifier (SSID) as some examples. The mobile device then establishes a wireless connection to the reader or access control unit. The connection is typically secured with an additional handshaking exchange for encrypting messaging between the endpoints. Once the connection is secured, the mobile device can then pass the access credentials or token to initiate the access authorization. Keycards remove or simplify much of this initial connection establishment and security overhead. Performance from the mobile device therefore remains slower even with the mobile device automatically initiating access authorization on behalf of a user.

There is a greater issue of security that stems from having the mobile device automatically initiate the access authorization without user action when the mobile device detects a reader or access control unit. Specifically, there is no means of authorizing the user's intent to access the restricted resource before, during, or after access to the restricted resource has been authorized. For instance, the user may walk by a locked door with no intention of walking through the door. If the mobile device automatically initiates the access authorization, the door will be unlocked allowing another unauthorized party access through the door. Similarly, an authorized user may be with or around a group of unauthorized users. If the authorized user's mobile device automatically initiates the access authorization, any of the unauthorized users that are closer to the door can gain access before the authorized user.

Accordingly, there is a need to better adapt mobile devices for authorizing access to a restricted resource. More specifically, there is need to expedite completion of the access authorization without comprising security. There is a therefore a need to retain a step for authorizing the intent of a user to access a restricted resource without introducing delay that slows mobile device based access authorization relative to keycard based access authorization, wherein the intent authorization ensures that the user authorized for access is the user accessing the resource that is the target of the authorization.

BRIEF DESCRIPTION OF THE DRAWINGS

A preferred embodiment for decoupled authorization for restricted resource access will now be described, by way of example only, with reference to the accompanying drawings in which.

DETAILED DESCRIPTION

I. Overview

Figure 1:
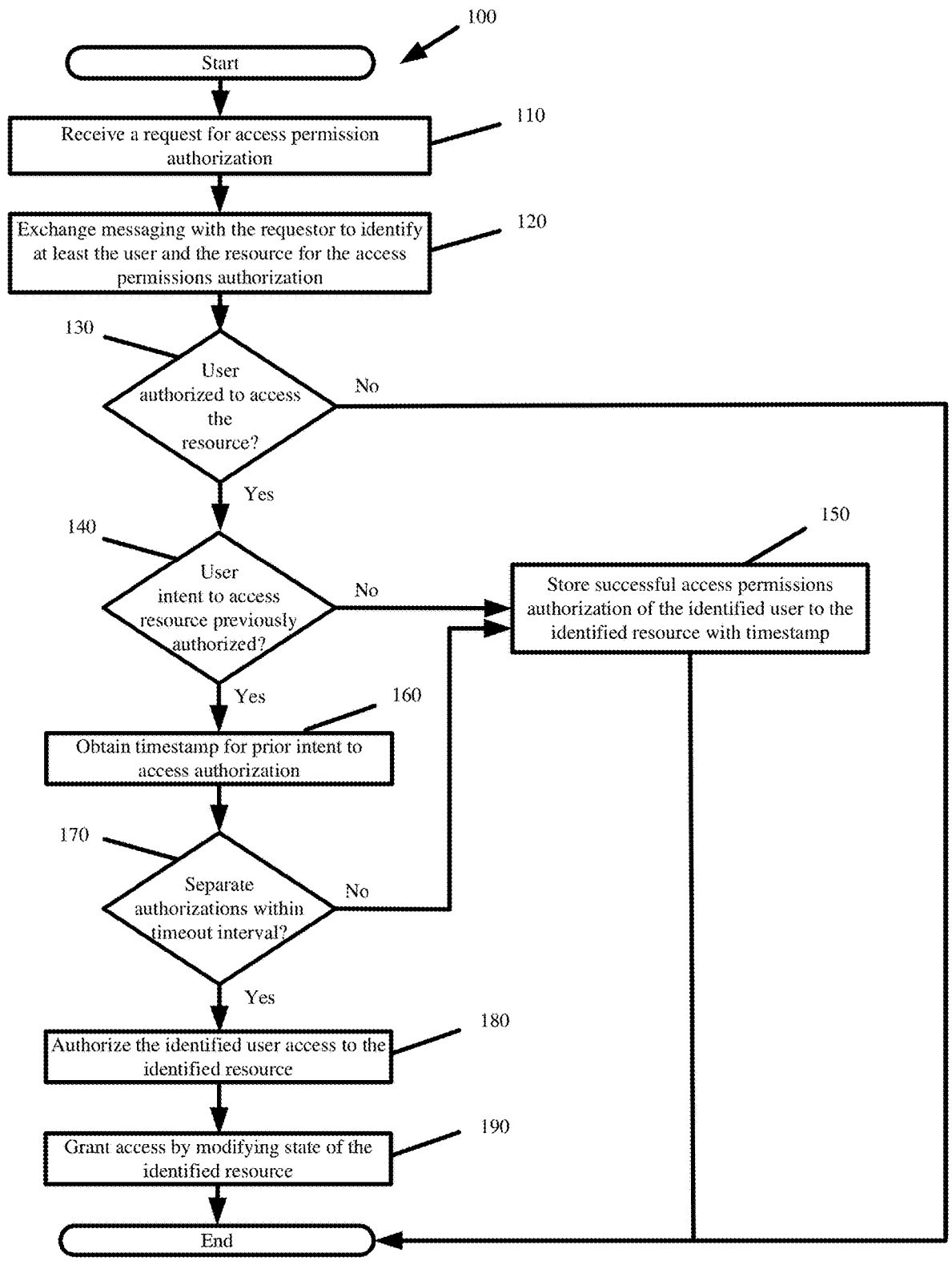
FIG. 1 presents a process for performing access permission authorization as part of the decoupled authorization of some embodiments.

This disclosure is directed to performing decoupled authorization for restricted access to a resource, and the systems and methods for performing such decoupled authorization. The decoupled authorization involves authorizing access permissions of a user to a particular resource separately and independently from authorizing intent of the user to access the particular resource. Access to the particular resource is granted in response to successfully authorizing the permissions and the intent of the user to access the particular resource.

Decoupling the access permission authorization from the intent to access authorization enables faster overall authorization to the restricted resource than when sequentially triggering the access permission authorization after authorizing the user's intent to access or vice versa. Through the decoupled authorization of some embodiments, one of the access permission authorization or intent to access authorization can be completed before initiating the other, thereby eliminating the delay associated with performing both authorizations immediately after one another. Similarly, the decoupled authorization of some embodiments allows the separate authorizations to be performed contemporaneously or simultaneously. In other words, the access permission authorization is not performed as a result of initiating, performing, or completing the intent to access authorization. Similarly, the intent to access authorization is not performed as a result of initiating, performing, or completing the access permission authorization The decoupled authorization presented herein does not compromise security as in the case when access permission authorization is automatically performed absent authorizing the user's intent to access. The decoupled authorization still conditions access to the restricted resource on successful authorization of the access permissions and the intent to access regardless of whether the intent to access authorization occurs before, during, or after the access permission authorization.

In some embodiments, the decoupled authorization is performed by an access control system. The access control system is a special purposed machine with at least a processor, memory, and wired or wireless network connectivity to one or more user mobile devices, electronic readers, resource valets, and the restricted resources under control of the access control system. The user mobile devices include any portable electronic device with network connectivity and can include smartphones, tablets, laptop computers, Internet-of-Thing (IoT) device, smartwatches, and other wearable electronic devices. The access control system (1) authorizes permissions of different users to access different resources, (2) authorizes intent of different users to access the different resources, (3) tracks successfully completed authorizations for different users to different resources, (4) grants a particular user access to a particular resource in response to successfully authorizing access permissions and intent to access of the particular user to the particular resource within a timeout interval, and (5) restricts the particular user access to the particular resource in response to unsuccessful authorization of one or more of the decoupled authorizations or the separate authorizations being successfully completed outside the timeout interval.

In preferred embodiments, the restricted resource is a door with an electronic lock. In some other embodiments, the restricted resource is any asset that is controlled electronically including windows, gates, thermostats, lighting, computers, and vehicles as some examples. The access control system controls access to these resources or assets electronically, wherein controlling access involves locking and unlocking, opening and closing, turning on and off, or otherwise changing between different states of the restricted resource. In some embodiments, wired or wireless signaling from the access control system grants or restricts access to the restricted resource. In some other embodiments, the access control system mechanically grants or restricts access to the restricted resource.

Access permission authorization involves identifying a user or user mobile device requesting access to the restricted resource and determining whether the user or user mobile device is permitted to access the restricted resource. FIG. 1 presents a process 100 for performing access permission authorization as part of the decoupled authorization of some embodiments. In some embodiments, process 100 is performed by the access control system.

Process 100 commences in response to receiving (at 110) a request for access permission authorization. Stated differently, process 100 commences in response to the access control system receiving a request of a first type for determining whether a user has rights to access a resource.

The process exchanges (at 120) messaging with the requestor to identify at least the user and the resource that are the subjects of the access permission authorization, wherein the requestor can be any of the user's mobile device or reader, resource valet, or other sensor or device that communicably couple the user mobile device to the access control system. The exchanged messaging can indirectly or directly identify the user. Indirect identification of the user involves receiving identifying information about the user mobile device that links back to the user, or receiving information that has to be processed in order to derive the user identity. For example, the request may include an image of the user or audio from the user. Image matching or phonetic matching may then be used to identify the user. Direct identification of the user involves receiving messaging with the user name, identifier, access credentials, or identification token.

The process determines (at 130) whether the identified user is authorized to access the identified resource. In some embodiments, the determination at 130 is based on matching the identified user and the identified resource against access permissions of different users to different resources stored by the access control system. In some embodiments, the determination at 130 is based on verifying whether access credentials or tokens of the identified user provide access to the identified resource. The access permission authorization is unsuccessful when the identified user is not permitted access to the identified resource. In such cases, the process can send an error message to the requestor or simply end. The access permission authorization is successful when the identified user is permitted access to the identified resource.

In response to successfully authorizing access permissions of the identified user to the identified resource, the process determines (at 140) whether the identified user's intent to access the identified resource has previously been successfully authorized. In some embodiments, the determination at 140 involves querying a first table using an identifier of the identified user. The first table tracks successful intent to access authorizations for different users to different resources for which the decoupled authorization remains incomplete because of incomplete access permission authorizations by the same users to the same resources.

In response to the first table not tracking a prior authorization of the identified user's intent to access the identified resource, the process stores (at 150) the successful access permission authorization of the identified user to the identified resource in a different second table. The second table tracks successful access permission authorizations of different users to different resources for which the decoupled authorization remains incomplete because of incomplete intent to access authorizations by the same users to the same resources. The process also stores a timestamp to indicate when the access permissions of the identified user were authorized for access to the identified resource.

In response to the first table tracking successful prior authorization of the identified user's intent to access the identified resource, the process obtains (at 160) the associated timestamp for that prior intent to access authorization. The process compares (at 170) the timestamp of the prior intent to access authorization with the current time of the successful access permission authorization to determine if the times fall within a timeout interval.

In response to the times falling outside the timeout interval, the prior intent to access authorization is stale as a result of being completed too far in the past. In such instances, the intent of the identified user to access the identified resource requires reauthorization. Accordingly, the process reverts to step 150. In other words, the access control system does not grant access when the user authorizes intent several minutes, hours, or days prior to authorizing access permissions to the same resource.

In response to the times falling within the timeout interval, the identified user successfully completes the decoupled authorization as a result of successfully and separately authorizing the identified user's intent and permissions to access the identified resource within the timeout interval. Consequently, the process authorizes (at 180) the identified user access to the identified resource and grants (at 190) the identified user access the identified resource by modifying state of the identified resource.

Intent to access authorization involves ascertaining that the user or user mobile device being authorized is intending to access the restricted resource. More specifically, the intent to access authorization differentiates between the user or user mobile device walking past or coming in range of the restricted resource, and the user or user mobile device coming with purpose to access the restricted resource.

A user's intent to access a particular resource can be directly authorized from an intent to access request or messaging issued from the user's mobile device, a reader, a resource valet, or other sensory system. In such cases, the request or messaging is issued in response to the user satisfying some condition, wherein the condition preauthorizes the user's intent to access with a high degree of accuracy. For example, the intent authorization request or message may issue in response to detecting the user to be inches from the resource to be accessed, or in response to the user performing some specific action that is tied to a showing of intent, such as speaking a specific phrase, making a specific bodily gesture, or interacting with a device in a specified manner. The access control system does not separately authorize intent in response to such requests or messaging, provided that the request or messaging identifies the user and the resource to which the intent applies and the authorized intent from the sending device is accurate.

In some other embodiments, the access control system authorizes intent in response to intent to access request or messaging. For instance, the user may demonstrate intent to access a particular resource by providing a signature on a touchscreen. The signature is passed to the access control system as part of the intent to access request or messaging. The access control system authorizes the intent in response to verifying that the provided signature matches a stored signature of the identified user. The access control system may similarly have to authorize intent when the intent to access request or messaging provides an image of a user. In this case, the access control system performs image recognition to determine the identity of the user in the image. The access control system can then authorize intent of the identified user.

Figure 2:
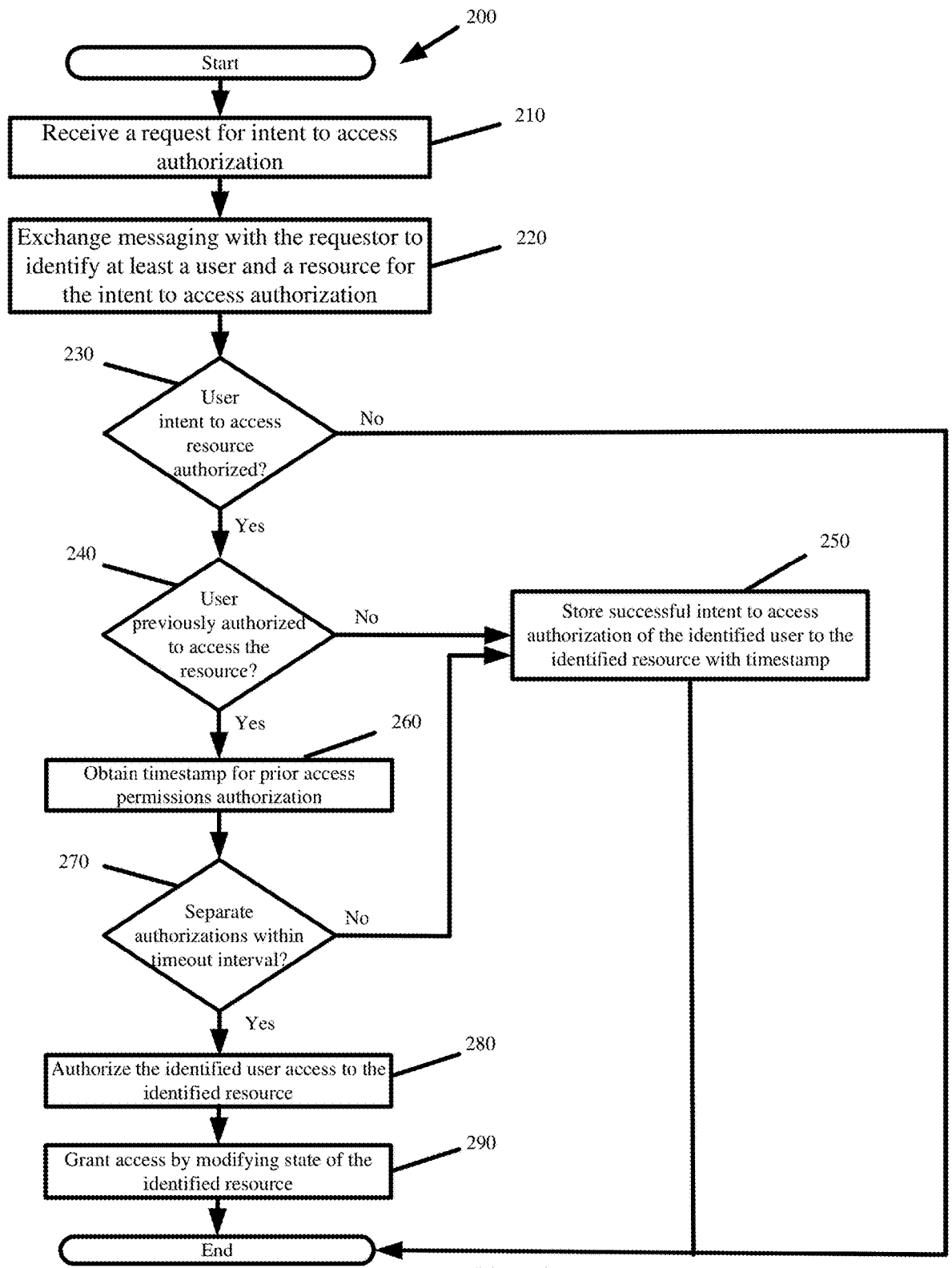
FIG. 2 presents a process for performing intent to access authorization as part of the decoupled authorization of some embodiments.

FIG. 2 presents a process 200 for performing intent to access authorization as part of the decoupled authorization of some embodiments. In some embodiments, process 200 is performed by the access control system. Process 200 can be performed in parallel with the access control system also performing process 100.

Process 200 commences in response to receiving (at 210) a request for intent to access authorization. The request for intent to access authorization is of a different second type than the request for access permission authorization. As will be described below in the sections to follow, the requests for the different authorizations may be received over different networks, in response to different triggers, or from different hardware.

The process exchanges (at 220) messaging with the requestor to identify at least a user and a resource that are the subjects of the intent to access authorization. In other words, the messaging identifies which user is intending to access which resource.

As noted above, the request or messaging may directly authorize a particular user's intent to access a particular resource when the request or messaging is passed in response to some event, action, or indicator demonstrating intent with a high degree of certainty. However, as also noted above, the process can separately authorize (at 230) the intent to access based on other information that is passed with the request or messaging. For instance, the process authorizes the intent to access through signature verification, image matching, location detection, or user identification.

In response to a failed authorization of the user's intent to access the identified resource, an error message is sent or the process ends. In response to a successful authorization of the identified user's intent to access the identified resource, the process determines (at 240) whether the identified user has previously successfully completed the access permission authorization with respect to the identified resource. Accordingly, the process queries the second table described in FIG. 1 above, wherein the second table tracks successful access permission authorizations of different users to different resources for which the decoupled authorization remains incomplete because of incomplete intent to access authorizations by the same users to the same resources.

In response to the second table not tracking prior authorization of the identified user's permissions to access the identified resource, the process stores (at 250) the successful intent to access authorization of the identified user to the identified resource in the first table, wherein the first table tracks successful intent to access authorizations for different users to different resources for which the decoupled authorization remains incomplete because of incomplete access permission authorizations by the same users to the same resources. The process also stores a timestamp to indicate when the intent of the identified user to access the identified resource was authorized.

In response to the second table tracking that the identified user has successfully authorized access permissions to the identified resource, the process obtains (at 260) the associated timestamp for that prior access permission authorization. The process compares (at 270) the timestamp of the prior access permission authorization with the current time of the successful intent to access authorization to determine if the times fall within the timeout interval.

In response to the times falling outside the timeout interval, the access permission authorization is stale as a result of being completed too far in the past. Accordingly, the permissions of the identified user to access the identified resource require reauthorization. Accordingly, the process reverts to step 250.

In response to the times falling within the timeout interval, the identified user successfully completes the decoupled authorization as a result of successfully and separately authorizing the identified user's intent and permissions to access the identified resource within the timeout interval. Consequently, the process authorizes (at 280) the identified user access to the identified resource and grants (at 190) the identified user access to the identified resource by modifying state of the identified resource.

II. Decoupled Authorization Over Different Networks

Figure 3:
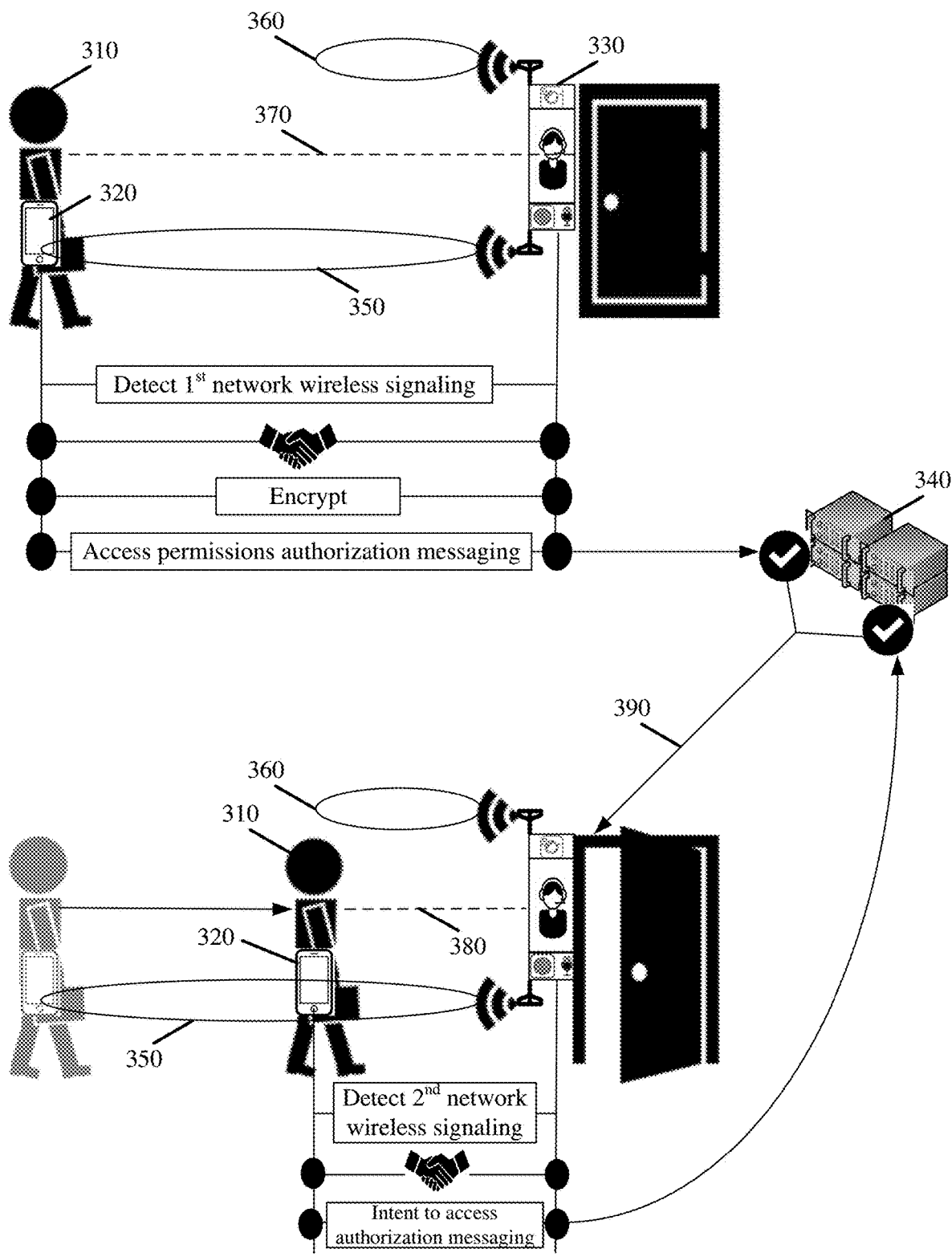
FIG. 3 illustrates the decoupled authorization of some embodiments with the access permission authorization occurring over a first network, and the intent to access authorization occurring over a different second network.

Some embodiments decouple the access permission authorization from the intent to access authorization by performing the authorizations across different and independent networks. FIG. 3 illustrates the decoupled authorization of some embodiments with the access permission authorization occurring over a first network, and the intent to access authorization occurring over a different second network. The figure illustrates a user 310, a mobile device 320 carried by the user 310, a resource valet 330 located adjacent to a restricted door, and an access control system 340 that is communicably coupled to the resource valet 330 and that controls access to the restricted door. The resource valet 330 can be substituted with a reader without affecting the decoupled authorization illustrated by FIG. 3, wherein the resource valet 330 is a virtual receptionist for communicating and responding to user inquiries.

The resource valet 330 contains first and second radios for wireless communications over a first network 350 and a second network 360. The mobile device 320 similarly contains at least the first and second radios for wireless communications over the first 350 and second 360 networks. The first network 350 of FIG. 3 can be WiFi (e.g., 802.11 a/b/g/n/ac/ad/af), Bluetooth, Bluetooth Low Energy (BLE), or other wireless network that has a greater range than the second network. The second network 360 of FIG. 3 can be a Near Field Communications (NFC) network, wherein NFC has shorter range than either WiFi, Bluetooth, or BLE.

The figure illustrates the user at a first distance 370 from the resource valet 330. At this first distance 370, the mobile device 320 detects a first signal emanating from the resource valet 330 over the first network 350. However, the mobile device 320 remains outside the range of a second signal emanating from the resource valet 330 over the second network 360 while at the first distance 370. It should be noted that the first signal can alternatively emanate from the access control system 340 when the first network has sufficient range and the first network wireless radio is contained in the access control system 340 in addition to or instead of in the resource valet 330.

In response to detecting the first signal, the mobile device 320 and resource valet 330 automatically establish a network connection with one another. The network connection between the mobile device 320 and the valet 330 is established without any action by the user 310. An access authorization application can have a background process running on the mobile device 320 that automatically initiates the connection establishment procedure upon detecting the first signaling or signaling identifying the first network 350, or detecting the resource valet 330 associated with the access control system 340 based on the first signaling passed over the first network 350. In some embodiments, establishing the connection includes exchanging handshaking messaging per the communication protocol used for first network. This can include performing a Transmission Control Protocol (TCP) handshake. The network connection communicably couples the mobile device 320 to the resource valet 330 and allows the mobile device 320 to exchange messaging wirelessly with the resource valet 330 over the first network 350.

The mobile device 320 proceeds to secure the connection. Securing the connection can involve exchanging secondary handshaking messaging. For instance, the mobile device 320 and resource valet 330 engage in a Transport Layer Security (TLS) handshake such that the subsequent messaging exchanged over the established connection is encrypted.

Access permission authorization is then initiated over the secured connection. The access permission authorization initiation can be triggered by the resource valet 330 submitting a request to the mobile device 320. The access permission authorization initiation can alternatively be trigged by the mobile device 320 in response to messaging the mobile device 320 sends to the resource valet 330. As noted above, the access permission authorization involves messaging to identify the user 310 or the user's mobile device 320. The messaging may include access credentials of the user 310, secure tokens, or basic identifying information. The resource valet 330 forwards the identifying messaging to the access control system 340 along with information about the restricted resource (i.e., the restricted door) for which access is sought.

In response to the forwarded access permission authorization messaging, the access control system 340 determines whether the identified user 310 or mobile device 320 is authorized to access the restricted resource. In this figure, access to the restricted resource by the user 310 or mobile device 320 is authorized by the access control system 340. However, the access control system 340 determines that the user 310 or mobile device's 320 intent to access the restricted resource has not yet been authorized. The access control system 340 temporarily queues the successful access permission authorization for the user 310 or mobile device 320. The access permission authorization may complete before the user 310 arrives at a second distance 380 from the resource valet 330 or after the user 310 arrives at the second distance 380.

At the second distance 380, the mobile device 320 detects a second signal emanating from the resource valet 330 over the second network 360. The shorter range of the second network 360 serves as an accurate signal with which the access control system 340 authorizes the intent to access. For instance, NFC based communication over the second network 360 between the mobile device 320 and the resource valet is limited to a distance of several inches. Being in this close proximity to the resource valet 330 is an accurate indication that the user 310 intends to access the restricted resource adjacent to the resource valet 330. Accordingly, the intent to access authorization procedure is initiated.

In FIG. 3, initiating the intent to access authorization involves handshaking between the mobile device 310 and the resource valet 330 over the second network 360. The handshaking establishes a different second network connection over which secondary identifying information about the user 310 or mobile device 320 passes to the resource valet 330.

In some embodiments, the second signal emanating from the resource valet 330 over the second network 360 serves as a trigger to initiate the intent to access authorization over the first network 350 instead of the second network 360. The intent to access authorization may be triggered by detecting the second signal over the second network 360, but performed over the first network 350 when the mobile device 320 cannot directly communicate with the resource valet 330 over the second network 360, or when the time to establish the second network 360 connection and the speed with which messaging is passed over the second network 360 is slower than messaging over the first network 350, especially when the connection established over the first network 350 at distance 370 is maintained and can be reused for performing the intent to access authorization. For instance, when the first network 350 is Bluetooth and the second network 360 is NFC, the data transfer rate over the first network 350 can be greater than 20 megabits per second, whereas the data transfer rate over the second network 360 is limited to 424 kilobits per second.

In some other embodiments, the second signal emanating from the resource valet 330 over the second network 360 serves as a trigger to simultaneously perform the intent to access authorization over the first network 350 and the second network 360. Doing so takes advantage of the fastest available network to the resource valet 330 and avoids unnecessary delays in the intent to access authorization if one network is congested or suffers a failure. The simultaneous intent to access authorization over two networks can also be conducted with two different endpoints. In particular, the mobile device may submit intent to access authorization messaging to the resource valet 330 over either one of the first and second networks 350 and 360, and simultaneously send the same intent to access authorization messaging to the access control system 340 over a long range third network (e.g., WiFi, Long Term Evolution (LTE), etc.)

The access control system 340 authorizes the intent of the user 310 to access the resource adjacent to the resource valet 330. The authorization is based on the intent to access authorization messaging passed from the mobile device 320 over the first network 350, the second network 360, both networks 350 and 360, or a third network. The access control system 340 also determines that the user's permissions to access the same resource were previously authorized when the user 310 was at the first distance 350. This completes both phases of the decoupled authorization for the user 310 or mobile device 320 to access the resource. Since both phases were successfully authorized within a specified amount of time between one another, the access control system 340 unlocks access (at 390) to the restricted resource allowing the user to pass through.

By performing the decoupled authorization over different networks, the access permission authorization and the intent to access authorization of FIG. 3 can occur independent of one another. This allows a first authorization to occur sooner such that only the second authorization remains outstanding when the user is ready to access the resource. As such, the decoupled authorization completes faster than when sequentially performing the different authorizations when the user is ready to access the resource. By decoupling the authorizations, the disclosed embodiments are able to unlock or provide other access to a resource in a seemingly near instantaneous manner.

It should be noted that the first and second networks illustrated in FIG. 3 are not limited to WiFi, Bluetooth, BLE, or NFC. Other short-range and long-range wireless networks can be used for the decoupled authorization. Moreover, the first network or the second network for the different authorizations can each be implemented over two or more non-overlapping networking technologies to support mobile devices that may not have one of the wireless radios for one of the supported networks.

III. Decoupled Authorization Based on Different Triggers

Figure 4:
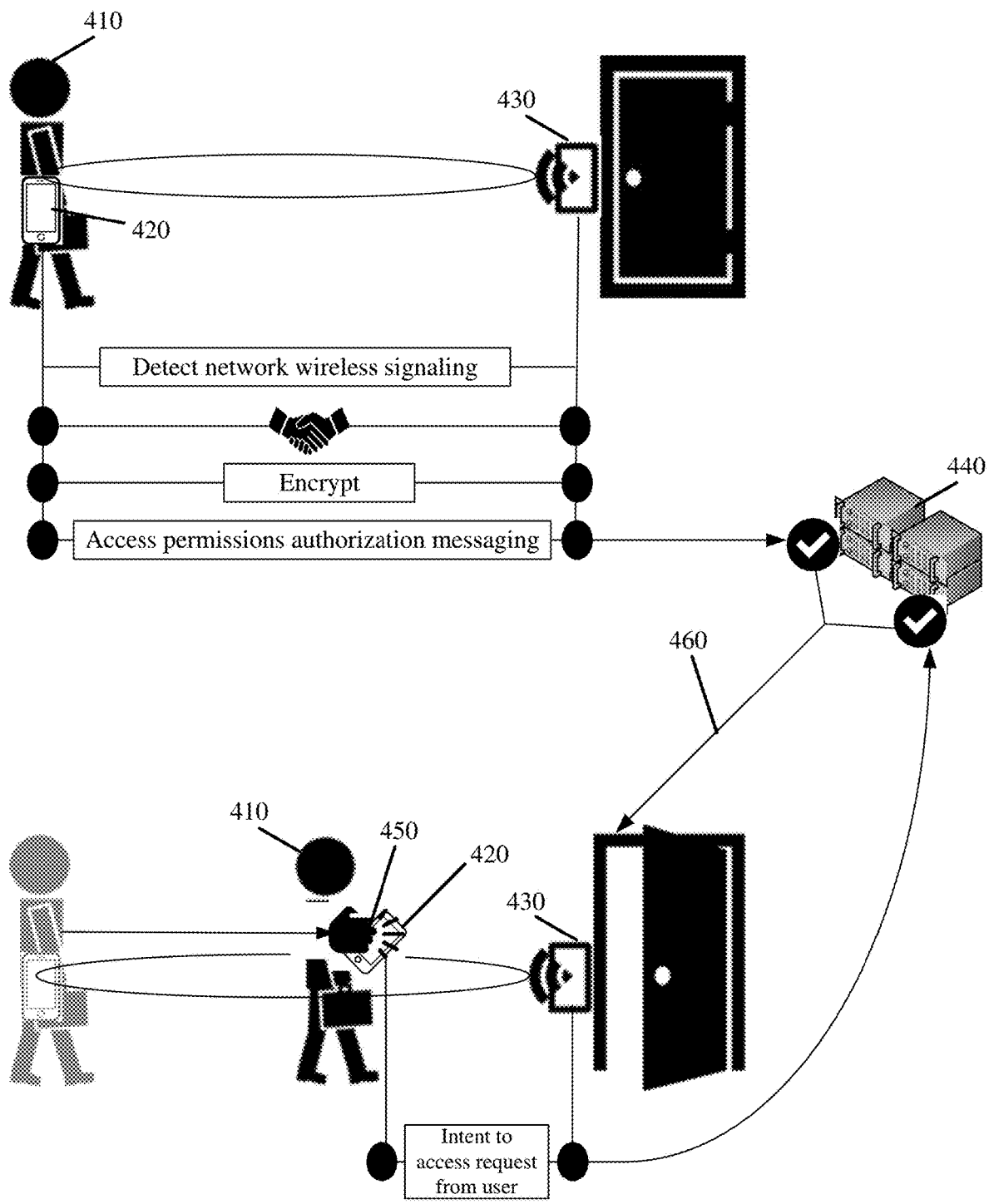
FIG. 4 illustrates the decoupled authorization of some embodiments with the access permission authorization initiating in response to detection of a first trigger, and the intent to access authorization initiating in response to detection of a different second trigger.

Some embodiments decouple the access permission authorization from the intent to access authorization by performing the authorizations in response to different and independent triggers. FIG. 4 illustrates the decoupled authorization of some embodiments with the access permission authorization initiating in response to detection of a first trigger, and the intent to access authorization initiating in response to detection of a different second trigger. The figure illustrates a user 410, a mobile device 420 of the user 410, a wireless reader 430 located adjacent to a restricted door, and the access control system 440 that is communicably coupled to the wireless reader 430.

Like FIG. 3, the access permission authorization is automatically initiated in response to the mobile device 420 detecting a signal emanating from the wireless reader 430. In this figure, detecting the signal from the wireless reader 430 serves as the first trigger for initiating the access permission authorization.

In FIG. 4, a gesture or action 450 performed by the user 410 serves as the second trigger for initiating the intent to access authorization. The gesture or action 450 is detected using a sensor of the mobile device 420. For example, the user 410 may knock on the mobile device 420. The knocking may by detected by an accelerometer, touchscreen, microphone, or camera of the mobile device 420. A decoupled authorization application running on the mobile device 420 ties the knocking gesture input 450 to the second trigger for initiating the intent to access authorization. In particular, the mobile device 420 notifies the access control system 440 of the intent and identity of the user 410, and optionally, the restricted resource that is the target of the intent. The notification is wirelessly passed as one or more messages or packets to the access control system 440. The access control system 440 may indirectly identify the user 410 based on the mobile device 420 performing the intent to access authorization and linking of the mobile device 420 to the user 410. The access control system 440 may indirectly identify the resource that is the target of the authorization based on proximity of the mobile device 420 location to the reader 430 or the resource adjacent to the reader 430.

Unlike in FIG. 3 where different networks were used for the access permission authorization and intent to access authorization, FIG. 4 can perform the intent to access authorization over the same network as the access permission authorization. For instance, the first trigger initiates the access permission authorization in response to the mobile device 420 detecting Bluetooth signaling from the reader 430, wherein performing the access permission authorization involves the mobile device 420 establishing a Bluetooth connection to the reader 430 and sending access credentials. The user 410 can then perform the gesture or action 450 for the second trigger which causes the mobile device 420 to send the intent to access authorization messaging using the same Bluetooth connection. Different networks can alternatively be used for performance reasons or when the mobile device 420 directly communicates the intent to access authorization to the access control system 440. As described with reference to FIG. 3, some embodiments support simultaneous messaging over different networks for performance purposes. In some such embodiments, detecting the second trigger causes the mobile 420 to send the intent to access authorization messaging over the Bluetooth connection and over a different WiFi, LTE, or other long range network connection simultaneously. The messages can be simultaneously passed over the different networks to the same endpoint or to different endpoints (i.e., the reader 430 and the access control system 440).

The access control system 440 authorizes the user 410 intent to access the particular resource and grants (at 460) the user 410 access to the particular resource as a result of the earlier completed access permission authorization for the user 410 to the particular resource and the now completed intent to access authorization for the user 410 to the particular resource. In this figure, granting access involves unlocking a door that is the target of the decoupled authorization.

Figure 5:
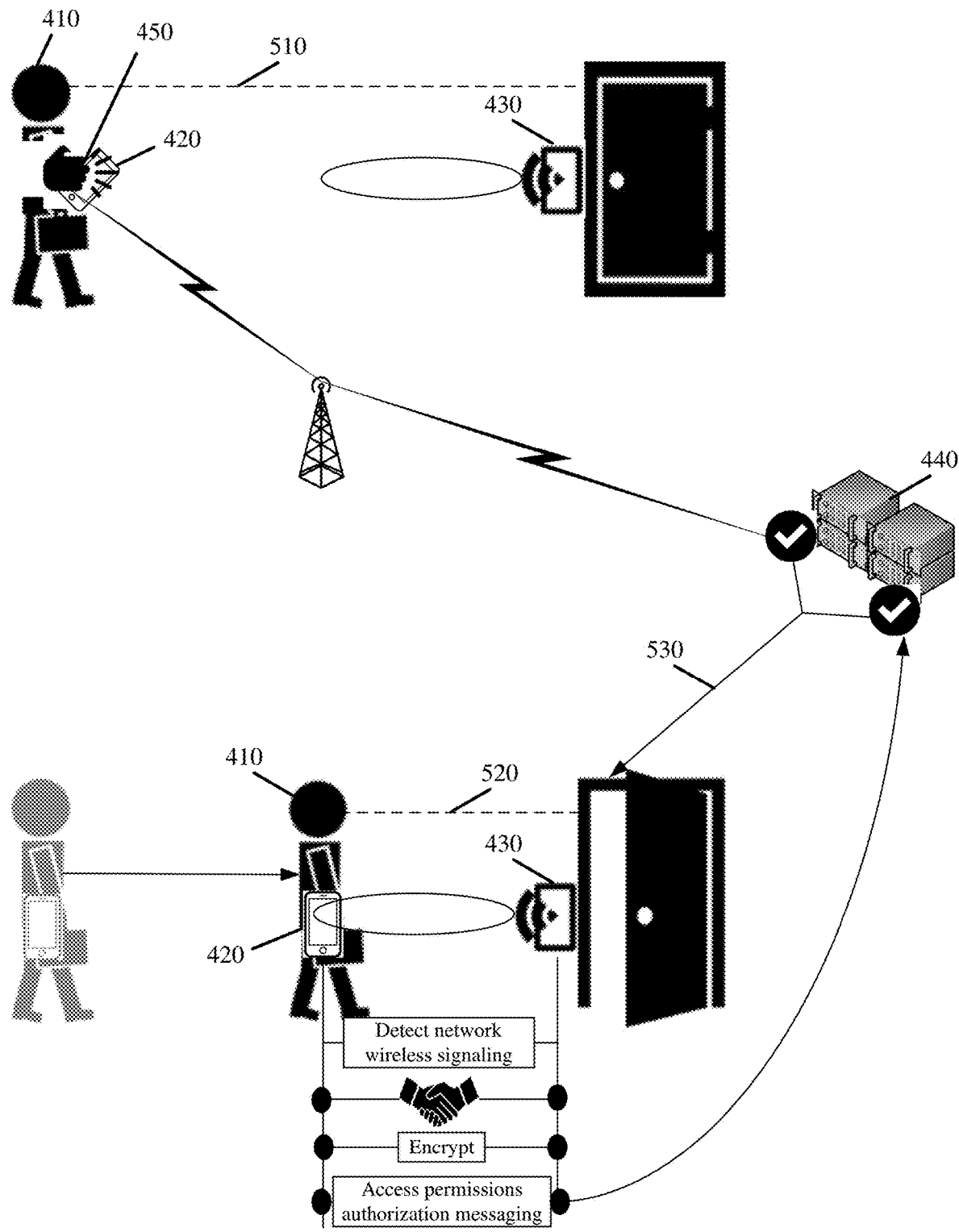
FIG. 5 illustrates the decoupled authorization of FIG. 4 being performed in a reverse ordering based on a different order of triggering the authorizations.

FIG. 5 illustrates the decoupled authorization of FIG. 4 being performed in a reverse ordering based on a different order of triggering the authorizations. In FIG. 5, the user 410 initiates the intent to access authorization by performing the gesture 450 on the mobile device 420 before the access permission authorization is triggered. In particular, the user 410 performs the gesture 450 while at a first distance 510 from the reader 430. The first distance 510 is too far for the mobile device 420 to detect the signal emanating from the reader 430.

In response to the gesture 450 and the corresponding trigger, the mobile device 420 establishes a long-range network connection (e.g., WiFi or LTE) directly to the access control system 440 and sends messaging identifying the intent of the user 410 to access a particular resource. The access control system 440 can identify the user 410 from the mobile device 420 sending the messaging or from the messaging itself. Similarly, the access control system 440 can identify the particular resource based on proximity of the user 410 position (as obtained from the mobile device 420 or from the messaging itself) to the particular resource position. The access control system 440 authorizes the intent to access and queues the authorization as the access permission authorization of the user 410 to the particular resource remains outstanding.

The user 410 then comes to a second distance 520 from the reader 430. At the second distance 520, the mobile device 420 detects the signal emanating from the reader 430 (e.g., via Bluetooth or NFC). The detected signal automatically triggers the access permission authorization. The detected signal can trigger the mobile device 420 to perform the access permission authorization over the same network with which the signal was detected (e.g., Bluetooth or NFC with the reader 430 forwarding the messaging to the access control system 3240), over a different network (e.g., Wifi or LTE) that directly connects to the access control system 440, or simultaneously over two or more networks.

The access control system 440 completes the access permission authorization and determines that the intent to access authorization for the same user 410 or mobile device 420 is already complete. Accordingly, the access control system 440 grants (at 530) the user 410 access to the restricted resource by the time the user 420 arrives at the restricted resource.

The decoupled authorization can be adapted for any multitude of different triggers. As per the examples above, the triggers can be gestures or actions performed by the user that are detected by one or more sensors of the user mobile device, reader, access control system, or other sensory system. An audio detecting sensor, such as a microphone, detects spoken words or other sounds produced by the user, any of which can serve as triggers. For example, the user may speak the words "open door". The sounds are detected and captured by a microphone of the mobile device or nearby reader. Phonetic matching determines that the sounds match those of a configured trigger for one of the access permission authorization or intent to access authorization. The phonetic matching can be performed on the mobile device, the nearby reader, or remotely at the access control system. Voice recognition can also be used to identify the user generating the sounds with the identifying information assisting the access control system in performing the authorizations. An image or motion capture sensor, such as a camera, detects movements and images of the user, any of which can serve as triggers. Image recognition of the user in a captured image can also assist the access control system in identifying the user for which an authorization is being performed.

Triggers for one or more of the decoupled authorizations can also be defined without user action or involvement. Such triggers are automatically detected by the user mobile device, reader, access control system, and other sensory systems based on signaling, positioning, or messaging. In some embodiments, a trigger is defined based on the user mobile device or reader automatically detecting the other. The devices can detect one another by wireless discovery procedures or other signaling that continually or periodically emanates from one or more of the devices. Similar to the example presented in FIG. 3, detecting a particular WiFi network can be a first trigger for a mobile device to perform one of the access permission authorization or intent to access authorization, and detecting a particular Bluetooth or NFC device can be a second trigger for the mobile device to perform the other authorization of the decoupled authorization. Global Positioning System (GPS) coordinates or geo-coordinates can also define triggers. For instance, when a user is in a parking lot of a building, the mobile device can trigger the access permission authorization for the user to access a front door of the building and when the user moves closer to the front door, the mobile device can trigger the intent to access authorization for the user to access the front door.

In each of the embodiments for decoupled authorization based on different triggers, access permission authorization remains independent of the intent to access authorization. Some embodiments do however require that the first and second triggers fire within some specified time of one another regardless of the firing order.

IV. Decoupled Authorization Using Different Hardware

Some embodiments decouple the access permission authorization from the intent to access authorization by leveraging different hardware to perform each of the authorizations. The user mobile device, the reader, the resource valet, or the access control system contain the hardware for performing the different authorizations. More specifically, the hardware for performing the decoupled authorization includes different sensors, processors, wireless radios, and other modules of the mobile device, the reader, the resource valet, or the access control system.

Figure 6:
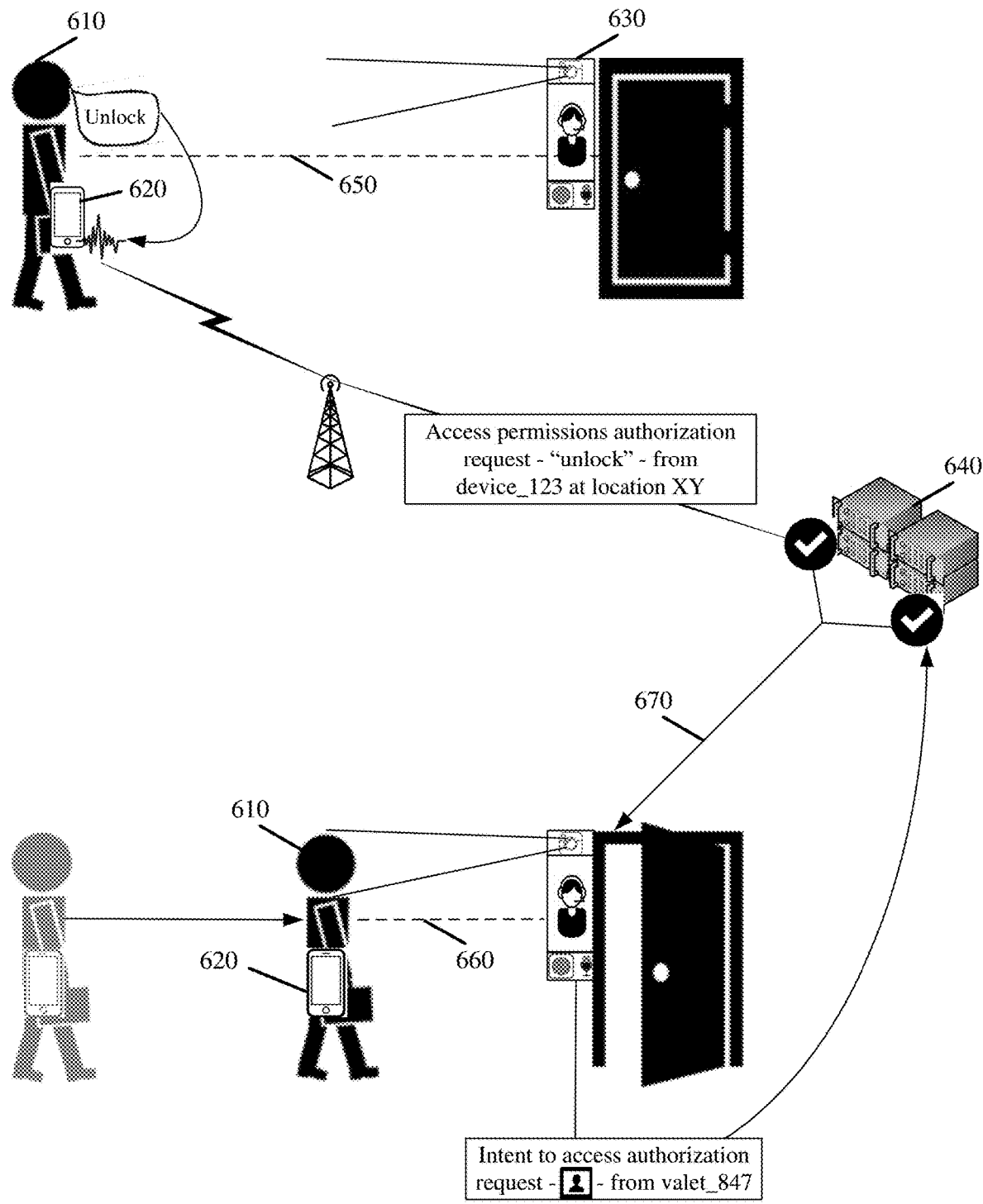
FIG. 6 illustrates the decoupled authorization of some embodiments with the access permission authorization being performed using first hardware, and the intent to access authorization being performed using different second hardware.

FIG. 6 illustrates the decoupled authorization of some embodiments with the access permission authorization being performed using first hardware, and the intent to access authorization being performed using different second hardware. The figure again illustrates a user 610, a mobile device 620 of the user 610, a resource valet 630 adjacent to a restricted resource, and an access control system 640 controlling access to the restricted resource. The mobile device 620, and more specifically, the microphone of the mobile device 620 is leveraged in performing the access permission authorization, and the resource valet 630, and more specifically, the camera of the resource valet 630 is leveraged in performing the intent to access authorization.

The user 610 is first shown at a first distance 650 from the restricted resource and the resource valet 630 that is adjacent to the restricted resource. The resource valet 630 contains a short-range camera or camera that automatically images people when they are a set distance away as determined from size within the camera's field-of-view. At this first distance 650, the user 610 is too far away. However, the user 610 speaks the word "unlock". The sound is detected by the microphone of the mobile device 620 and the mobile device 620 performs phonetic matching to determine that the sound contains the keyword for initiating the access permission authorization. Accordingly, the mobile device 620 performs the access permission authorization with the access control system 640. In performing the access permission authorization, the mobile device 620 sends the access control system 640 the identity of the user 610 based on stored access credentials or indirect linking of the mobile device 620 to the user 610, the identity of the restricted resource based on the proximity between the mobile device 620 and the restricted resource, and a request to conduct the access permission authorization.

The user 610 then moves to a closer second distance 660 from the resource valet 630. The camera of the resource valet 630 captures a high-resolution image of the user 610 when the user 610 is at the second distance 660. The resource valet 630 then performs the intent to access authorization in response to the captured image. In performing the intent to access authorization, the resource valet 630 sends the image along with the identity of the resource valet 630 that is linked to the restricted resource to the access control system 640. The access control system 640 performs image matching to identify the user 610 in the image and completes the intent to access authorization for the restricted resource. The access control system 640 further determines that the access permission authorization for the same user and the same restricted resource was successfully completed earlier, such that the successful completion of the intent to access authorization causes the access control system 640 to unlock (at 670) the restricted resource. The user 610 can now pass through the unlocked door.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method comprising:
  performing, via at least a first wireless message exchanged between a first device of a user and a second device of an access control system, a first authorization of the user to access a restricted resource under control of the access control system in response to detection of a first trigger;
  performing, via at least a second wireless message exchanged between the first device and the second device, a different and independent second authorization of said user to access the restricted resource in response to detection of a different second trigger; and
  modifying access to the restricted resource from the access control system in response to successfully completing said first authorization and said second authorization based on the first wireless message and the second wireless message being exchanged in response to different triggers.

2. The method of claim 1 further comprising detecting the first trigger in response to a first action by said user or a first position of said user.

3. The method of claim 2 further comprising detecting the second trigger in response to a different second action by said user or a different second position of said user.

4. The method of claim 3, wherein the first action is a particular phrase spoken by said user, and wherein the second action is a particular movement or gesture performed by said user.

5. The method of claim 3, wherein said first position is a position at which a mobile device of said user enters in range of a particular wireless network, and wherein detecting the first trigger comprises detecting the particular wireless network.

6. A method comprising:
  performing a first authorization of a user to access a restricted resource under control of an access control system based on at least a first message exchanged between a first device of the user and a local second device of the access control system that is disposed next to the restricted resource in response to detecting a first user action or a first network with a first sensor of one of the first device or the local second device;
  performing a different and independent second authorization of said user to access the restricted resource based on at least a second message exchanged between the first device and a remote third device of the access control system that is located away from the restricted resource in response to detecting a second user action or a second network with a different second sensor of one of the first device or the remote third device; and
  modifying access to the restricted resource from the access control system in response to successfully completing said first authorization and said second authorization based on the first wireless message and the second wireless message being exchanged in response to the different user actions or networks.

7. The method of claim 6 further comprising receiving the first user action in response to the first sensor (i) sensing a first gesture or phrase spoken by said user or (ii) sensing a first position of said user.

8. The method of claim 7 further comprising receiving the second user action in response to the second sensor (i) sensing a different second gesture or phrase spoken by said user or (ii) sensing a different second position of said user.

9. The method of claim 6, wherein the first sensor is a microphone of the first device of said user or the local second device adjacent to said restricted resource, and wherein performing the first authorization comprises initiating the first authorization in response to the first user action comprising a particular audible phrase said microphone captures from the user.

10. The method of claim 6, wherein the first sensor is a camera or touchscreen of the first device of said user or the local second device adjacent to said restricted resource, and wherein performing the first authorization comprises initiating the first authorization in response to the first user action comprising a particular motion or gesture captured by said camera or touchscreen.

11. The method of claim 6, wherein the first sensor is one of a microphone, camera, touchscreen, and wireless network radio, and wherein the second sensor is a different one of said microphone, said camera, said touchscreen, and said wireless network radio.

12. The method of claim 6, wherein said performing the first authorization comprises authorizing access permissions of said user to access said restricted resource, and wherein said performing the second authorization comprises authorizing intent of said user to access said restricted resource.

13. The method of claim 12, wherein said modifying access comprises granting access to the restricted resource in response to independently authorizing permissions of said user to access said restricted resource and authorizing intent of said user to access said restricted resource.

14. The method of claim 6, wherein said performing the first authorization comprises exchanging messaging over a first wireless network, and wherein said performing the second authorization comprises exchanging messaging over a different second wireless network.

15. The method of claim 6, wherein said modifying access comprises providing said user with access to said restricted resource in response to successfully completing said second authorization within a timeout interval of completing said first authorization, and the method further comprising restricting said user access to said restricted resource in response to successfully completing said second authorization outside the timeout interval of completing said first authorization.

16. The method of claim 6 further comprising detecting the first network with the first sensor of the first device, and detecting the second network with the second sensor of the first device, wherein the first sensor and the second sensor correspond to first and second wireless radios of the first device.

17. An access control system comprising:
a restricted resource; and
a system device comprising:
   a non-transitory computer-readable medium storing a set of processor-executable instructions; and
   one or more processors configured to execute the set of processor-executable instructions, wherein executing the set of processor-executable instructions causes the one or more processors to:
     perform, via at least a first wireless message exchanged between the system device and a user device of a user, a first authorization of the user to access the restricted resource in response to detection of a first trigger;
     perform, via at least a second wireless message exchanged between the system device and the user device, a different and independent second authorization of said user to access the restricted resource in response to detection of a different second trigger; and
     modify access to the restricted resource in response to successfully completing said first authorization and said second authorization based on the first wireless message and the second wireless message being exchanged in response to different triggers.

* * * * *